Oct. 2, 1951  E. G. AUTIE ET AL  2,569,968
FLASH CONTROL ELECTRODE
Filed Jan. 5, 1948  2 Sheets-Sheet 1

Inventors
Edward G. Autie &
Frederick W. Johnes

Oct. 2, 1951 — E. G. AUTIE ET AL — 2,569,968
FLASH CONTROL ELECTRODE
Filed Jan. 5, 1948 — 2 Sheets-Sheet 2

INVENTORS
EDWARD G. AUTIE &
FREDERICK W. JOHNES
By Young, Emery & Thompson
ATT'YS Patented Oct. 2, 1951

2,569,968

UNITED STATES PATENT OFFICE 2,569,968

FLASH CONTROL ELECTRODE

Edward George Autie and Frederick William Johnes, London, England, assignors to Applied High Frequency Limited, London, England, a British company Application January 5, 1948, Serial No. 496
In Great Britain January 7, 1947

7 Claims. (Cl. 219—47)

This invention relates to improvements in the welding of dielectric plastics by the use of high-frequency electric heating and particularly to spot welding. Spot welding may be applied to contiguous or overlapping sheets, strips, bars, rods, flanges and the like in two or more layers, and in this specification the separate elements will be referred to as "pieces" while the assembly undergoing welding will be referred to as "the work." The expression "spot welding" implies that a particular weld or union is localised within a restricted area of the work which area may be circular, elliptical, rectangular or of other suitable contour. As is known (say in the case of overlapping sheets or strips) the welding is effected between two metal electrodes each of which is in contact with one side of the work. One of these electrodes may be a plate of a surface greater than the area of the weld or union produced at one welding operation. The other electrode (or each electrode) may have a contact face of substantially the same area and contour as the weld or union produced, and such a localised electrode is hereinafter referred to as a "spot electrode."

Typical examples of dielectric thermoplastic materials which can be welded are methyl methacrylate polymer, polyvinyl chloride or polyvinyl acetate. Typical examples of dielectric thermosetting materials which can be welded are the condensation products of phenol-formaldehyde or urea-formaldehyde before condensation has been completed.

It is a common experience that when any material in a softened or plastic state is subjected to local pressure, material under pressure is displaced or extruded. Thus if two overlapping strips of thermoplastic material be softened by heat and subject to welding pressure, extruded material or "flash" escapes laterally or radially outwards from the area of the weld. One subject of this invention is to provide a method and apparatus for the welding of dielectric plastics by the use of high-frequency electric heating and by the use of pressure in which such escape laterally or radially outwards from the area of the weld shall be prevented or minimised.

This invention relates to a method of welding pieces of dielectric plastics by the use of high-frequency electric heating in which a spot electrode is surrounded by a pressure member of refractory insulating material pressed into contact with one face of the work so that when softening and welding take place, escape or extrusion of the dielectric plastic material cannot take place radially or laterally outwards and any displaced material is retained under the contact face of the spot electrode.

The spot electrode may have on its contact face a recess to accommodate displaced plastic (or flash).

In a preferred method, the spot electrode is axially movable in relation to the surrounding pressure member and is resiliently controlled so that softened plastic displaced during welding does not escape past the pressure member but is accommodated within the area of the yielding spot electrode.

The electrically-conducting spot electrode may comprise two concentric portions, viz. an outer unyielding sleeve immediately within the pressure member and a central resiliently-controlled yielding electrode, the arrangement being such that softened plastic displaced during welding is accommodated within the area of the central yielding electrode.

This invention also relates to apparatus for spot welding dielectric plastics by the use of high-frequency electric heating which apparatus comprises two electrodes to engage opposite faces of the work, one at least of said electrodes being a spot electrode which is surrounded by a refractory insulating pressure member having resilient means for pressing it into contact with the work to prevent extrusion of displaced material radially or laterally outwards from the spot electrode.

In a preferred form of the apparatus the spot electrode comprises two concentric parts, viz. an unyielding cylindrical sleeve immediately within the pressure member and a central, resiliently - controlled yielding electrode axially movable in relation to the sleeve so that during a welding operation, the contact face of the sleeve applies steady pressure to the work and displaced plastic cannot escape radially outwards but is accommodated within the area of the contact face of the central yielding electrode.

The invention will be more clearly understood from the following description of an example, reference being made to the drawings in which.

Figure 1:
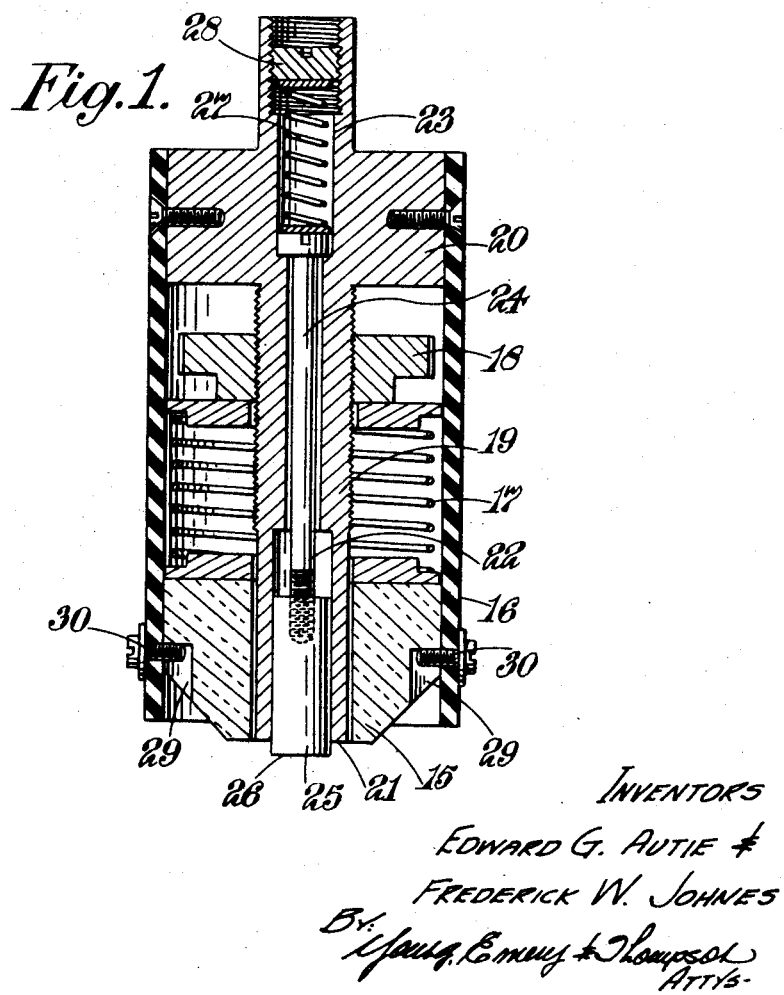
Fig. 1 is a sectional elevation of a spot welding electrode.

Referring to Figure 1, a pressure member 15 made of refractory insulating material is enclosed in an insulating sleeve 16 and is axially movable in said sleeve under the resilient control of a spring 17 lying between the upper surface of the pressure member 15 and an adjusting collar 18 which is in screw engagement with a sleeve 19 which has a head 20 secured to the outer insulating sleeve 16. The sleeve 19 is of metal, say copper, and has a contact face 21 which forms an operative part of the spot electrode. The sleeve 19 has at its lower end a cylindrical recess 22 and at its upper end another cylindrical recess 23. Within the sleeve 19 is a central rod 24 carrying at its lower end the inner yielding electrode 25 which in this case has a flat contact face 26. In the recess 23 is a spiral spring 27 which applies yielding pressure to the inner electrode 25 and the compression in the spring 27 can be regulated by a slotted plug 28 which can screw within the top of the metal sleeve 19.

To regulate the movement of the pressure member 15 it is provided at its periphery with short vertical slots 29 engaging the inner end of screws 30 passing through the outer insulating sleeve 16.

Figure 2:
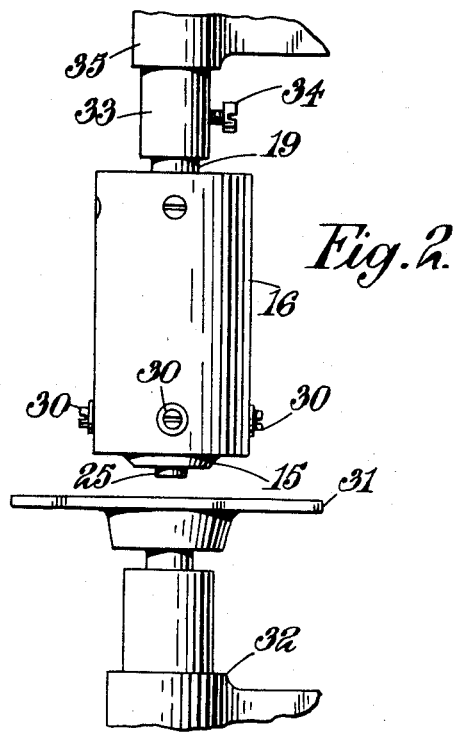
Figure 2 is an elevation of a welding press.

Figure 2 indicates the general arrangement of the welding press. The lower electrode 31 is a plate held in a fixed support 32. The upper part of the metal sleeve 19 is inserted into a cylindrical electrode holder 33 and is secured therein by a screw 34. The electrode holder 33 forms part of the movable member 35 of the press.

Figure 3:
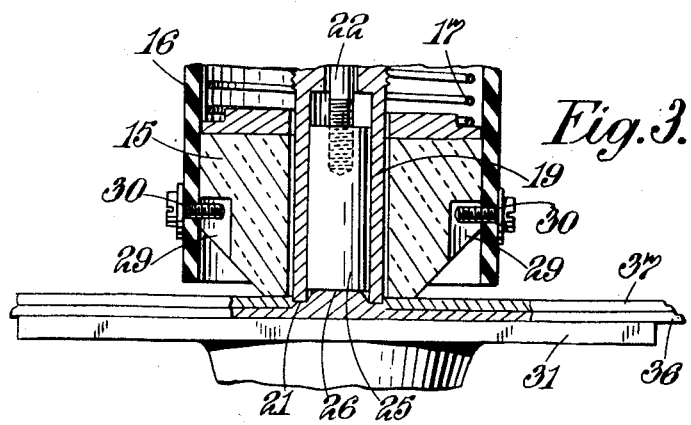
Figure 3 is a sectional elevation on an enlarged scale showing the welding of two pieces of thermoplastic.

Referring to Figure 3, a lower piece of thermoplastic 36 lies in contact with the plate 31 and an upper piece of thermoplastic 37 lies in contact with the lower piece 36 and is subjected to pressure not only by the pressure member 15 but also by the contact face 21 of the conducting sleeve 19 and the contact face 26 of the inner electrode 25. The high-frequency alternating electric field is set up between the electrode plate 31 and the composite spot electrode 19, 25. The material of the work directly between the electrodes softens and the contact face 21 of the unyielding sleeve 19 exerts a maximum pressure on the work. The spring 17 keeps the contact face of the pressure member 15 in firm contact with the face of the work and prevents escape of displaced plastic radially outwards. The displaced plastic acts on the contact face 26 of the yielding electrode 25 as indicated in Figure 3.

In the arrangement shown the pieces of thermoplastic 36 and 37 are in close contact but it will be understood that in certain circumstances they may be separated (except at the weld) by an interlayer or by an air space.

The pressure exerted by the springs 17 and 27 is adjusted at will.

It will be understood that when under the action of the heat and pressure the plastic softens, a single mass of plastic is formed between the electrodes by the complete union of the two (or more) layers of plastic as indicated in Figure 3.

If desired the travel of the upper electrode as a whole may be arrested when a predetermined separation from the lower electrode is reached.

Normally the contact face 21 of the sleeve 19 produces an annular depression in the upper surface of the plastic and the softened and extruded plastic under the contact face 26 of the yielding electrode 25 produces a substantially circular flat-topped protuberance or stud. However the contact face of the yielding electrode 25 (or electrodes if more than one be used) can take various forms to produce any desired configuration on the weld.

Figure 4:
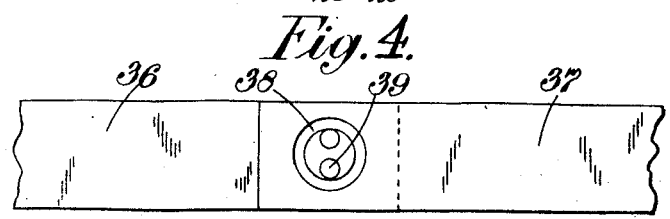
Figure 4 is a plan of one alternative form of welded strips.

Thus as indicated in Figure 4 although the two layers 36 and 37 are united between the electrodes, the annular depression 38 is formed by annular contact face 21 while two spots 39 may be formed by the contact face 26.

We claim:

1. A spot welding electrode, for use in the spot welding of dielectric plastic material by high frequency electric heating, comprising a conducting sleeve providing an annular end face at one end for engagement with the work to be welded, a conducting plunger slidable within the sleeve and in electrical contact therewith, which plunger has its end face corresponding to the said end face of the sleeve arranged for engagement with the work, resilient means operating to urge the plunger to slide within the sleeve in the direction towards said annular face and outwardly of the sleeve, said resilient means being arranged so that when the end face of the plunger is substantially flush with the end face of the sleeve, said resilient means are lightly loaded and permit inward movement of the plunger under pressure applied to the end thereof during welding thereby to form a recess in the end of the electrode for reception of softened plastic material displaced during welding which recess is bounded by the sleeve and said end face of the plunger, and a heat-resisting insulating pressure member surrounding said sleeve and providing around the end of the sleeve a face for engagement with the work.

2. An electrode as claimed in claim 1 and including stop means arranged to prevent outward movement of the plunger beyond a position in which the said end face thereof protrudes a short distance beyond the end of the sleeve.

3. A spot welding electrode, for use in the spot welding of dielectric plastic material by high frequency electric heating, comprising a conducting sleeve providing an annular end face at one end for engagement with the work to be welded, a conducting plunger slidable within the sleeve and in electrical contact therewith, which plunger has its end face corresponding to the said end face of the sleeve arranged for engagement with the work, first resilient means operating to urge the plunger to slide within the sleeve in the direction towards said annular face and outwardly of the sleeve, said first resilient means being arranged so that when the end face of the plunger is substantially flush with the end face of the sleeve, said first resilient means are lightly loaded and permit inward movement of the plunger under pressure applied to the end thereof during welding thereby to form a recess in the end of the electrode for reception of softened plastic material displaced during welding which recess is bounded by the sleeve and said end face of the plunger, a heat-resisting insulating pressure member surrounding and slidable along said sleeve and providing around the end of the sleeve a face for engagement with the work, and second resilient means urging said pressure member along the sleeve to make pressure contact with the work.

4. An electrode as claimed in claim 3, in which the plunger is arranged centrally within the sleeve.

5. An electrode as claimed in claim 4, in which the said end face of the plunger is embossed with a design.

6. A spot welding electrode, for use in welding dielectric plastic material by the use of high frequency electric heating, comprising a tubular shell, a conducting sleeve extending within the shell lengthwise thereof, rigidly secured thereto and having one end projecting from one end of the shell, which sleeve provides an annular face at its projecting end for engagement with the work to be welded, a conducting plunger slidably received within the sleeve and in electrical contact therewith, which plunger has an end face for engagement with the work, first resilient means urging the plunger outwardly of the sleeve, in a direction towards the projecting end thereof, as far as a position in which the said face of the plunger lies adjacent the projecting end of the sleeve, stop means for preventing further movement of the plunger beyond said position in said direction, a heat-resisting insulating pressure member closely surrounding said sleeve within the shell and projecting from said shell, at the same end as the sleeve projects, to provide an annular face for engagement with the work at a position around and adjacent to said face of the sleeve, second resilient means, acting between the pressure member and an abutment rigidly secured to said shell, urging said pressure member outwardly of the shell to apply pressure to the work, and stop means limiting the movement of the pressure member in a direction outwardly of the shell.

7. A spot electrode for use in welding dielectric plastic material by the use of high frequency electric heating comprising a cylindrical electrically-insulating shell, a refractory insulating pressure member concentric with said shell and axially-movable therewithin in relation thereto against the resilient restraint imposed by a helical spring positioned between the pressure member and an abutment on said shell, an electrically-conducting sleeve rigidly secured to said shell, concentric therewith, and passing through said pressure member with the extremity intended to contact the work approximately coplanar with the extremity of the pressure member intended to contact the work when in its outwardly extreme position, an electrically conducting cylinder concentric with and surrounded by said sleeve and axially movable relative thereto and a helical spring positioned between a second abutment on said shell and said cylinder.

EDWARD GEORGE AUTIE.
FREDERICK WILLIAM JOHNES.

REFERENCES CITED

The following references are of record in the file of this patent:

UNITED STATES PATENTS

| Number | Name | Date |
|---|---|---|
| 2,244,455 | Gengenbach | June 3, 1941 |
| 2,354,714 | Strickland | Aug. 1, 1944 |
| 2,401,991 | Walton et al. | June 11, 1946 |
| 2,422,525 | Brown et al. | June 17, 1947 |
| 2,423,902 | Peterson | July 15, 1947 |
| 2,425,123 | Quayle et al. | Aug. 5, 1947 |
| 2,434,025 | Wallace | Jan. 6, 1948 |
| 2,445,747 | Watter | July 20, 1948 |
| 2,472,820 | Graham et al. | June 14, 1949 |

FOREIGN PATENTS

| Number | Country | Date |
|---|---|---|
| 591,738 | Great Britain | Aug. 27, 1947 |